(12) United States Patent
Nishimura et al.

(10) Patent No.: US 10,745,889 B2
(45) Date of Patent: Aug. 18, 2020

(54) WORK MACHINE AND METHOD FOR CONTROLLING WORK MACHINE

(71) Applicant: KOMATSU LTD., Tokyo (JP)

(72) Inventors: Minetaka Nishimura, Tokyo (JP); Yuki Shimano, Tokyo (JP); Takuya Sonoda, Tokyo (JP)

(73) Assignee: KOMATSU LTD., Tokyo (JP)

( * ) Notice: Subject to any disclaimer, the term of this patent is extended or adjusted under 35 U.S.C. 154(b) by 6 days.

(21) Appl. No.: 15/540,596

(22) PCT Filed: Nov. 9, 2016

(86) PCT No.: PCT/JP2016/083219
§ 371 (c)(1),
(2) Date: Jun. 29, 2017

(87) PCT Pub. No.: WO2018/087834
PCT Pub. Date: May 17, 2018

(65) Prior Publication Data
US 2018/0274210 A1    Sep. 27, 2018

(51) Int. Cl.
| | |
|---|---|
| *G01G 19/14* | (2006.01) |
| *E02F 9/26* | (2006.01) |
| *E02F 3/32* | (2006.01) |
| *G01P 15/16* | (2013.01) |
| *G05B 13/04* | (2006.01) |
| *E02F 3/42* | (2006.01) |
| *G01G 19/08* | (2006.01) |
| *E02F 9/22* | (2006.01) |
| *E02F 3/43* | (2006.01) |
| *G01P 3/487* | (2006.01) |

(52) U.S. Cl.
CPC .............. *E02F 9/26* (2013.01); *E02F 3/32* (2013.01); *E02F 3/425* (2013.01); *E02F 3/435* (2013.01); *E02F 9/2271* (2013.01); *E02F 9/264* (2013.01); *G01G 19/083* (2013.01); *G01P 15/16* (2013.01); *G05B 13/042* (2013.01); *G01P 3/487* (2013.01)

(58) Field of Classification Search
None
See application file for complete search history.

(56) References Cited

U.S. PATENT DOCUMENTS

| | | | |
|---|---|---|---|
| 7,912,612 B2 * | 3/2011 | Janardhan | B25J 9/1638 37/413 |
| 9,617,717 B2 * | 4/2017 | Kondo | E02F 9/264 |
| 2003/0090384 A1 * | 5/2003 | Nishimura | E02F 3/962 340/685 |
| 2008/0169131 A1 | 7/2008 | Takeda et al. | |

(Continued)

FOREIGN PATENT DOCUMENTS

| | | |
|---|---|---|
| CN | 101142466 A | 3/2008 |
| CN | 2511678 A | 6/2009 |

(Continued)

*Primary Examiner* — Aditya S Bhat
(74) *Attorney, Agent, or Firm* — Faegre Drinker Biddle & Reath LLP

(57) ABSTRACT

A hydraulic excavator has a boom, an arm, a bucket, and a boom cylinder which drives the boom. A load value within the bucket is computed based on a load of the boom cylinder, and the load value obtained by computing is corrected based on an acceleration of extension/retraction of the boom cylinder.

6 Claims, 8 Drawing Sheets

(56) References Cited

U.S. PATENT DOCUMENTS

| | | |
|---|---|---|
| 2009/0187527 A1 | 7/2009 | Mcaree et al. |
| 2014/0231153 A1 | 8/2014 | Fukasu et al. |
| 2015/0066312 A1 | 3/2015 | Sakuda et al. |
| 2016/0244949 A1 | 8/2016 | Kanemitsu |
| 2016/0251835 A1* | 9/2016 | Kitajima ............... E02F 3/3663 701/50 |

FOREIGN PATENT DOCUMENTS

| | | |
|---|---|---|
| CN | 101467011 A | 6/2009 |
| CN | 101999069 A | 3/2011 |
| CN | 102735318 A | 10/2012 |
| JP | 2001-183222 A | 7/2001 |
| JP | 2010-089633 A | 4/2010 |
| JP | 2011-508187 A | 3/2011 |
| JP | 2014-137343 A | 7/2014 |
| JP | 2015-158049 A | 9/2015 |
| JP | 2015-227582 A | 12/2015 |
| JP | 5844465 B1 | 1/2016 |
| JP | 5887405 B | 2/2016 |
| WO | WO-2006/098218 A1 | 9/2006 |
| WO | WO-2009/073127 A2 | 6/2009 |
| WO | WO-2013/065415 A1 | 5/2013 |
| WO | WO-2013/172277 A1 | 11/2013 |

* cited by examiner

ABSTRACT# WORK MACHINE AND METHOD FOR CONTROLLING WORK MACHINE

TECHNICAL FIELD

The present invention relates to a work machine and a method for controlling a work machine.

BACKGROUND ART

A load within a bucket is important for knowing a work amount of a work machine. A technique of computing a load value within a bucket is disclosed for example in Japanese Patent Laying-Open No. 2010-89633 (PTD 1).

In this publication, a current load value of a load is obtained by computing from the attitude of a work machine and the pressure acting on a boom cylinder. By integrating the current load value, an integrated load value is computed. When the integrated load value reaches a target load value, this state is reported to an operator.

CITATION LIST

Patent Document

PTD Japanese Patent Laying-Open No. 2010-89633

SUMMARY OF INVENTION

Technical Problem

However, according to the method for computing the load value described in the above publication, the load value within the bucket may fail to be obtained accurately. Accordingly, there has been a demand for improving measurement accuracy when measuring a bucket load.

An object of the present invention is to provide a work machine capable of improving measurement accuracy when measuring a load, and a method for controlling the work machine.

Solution to Problem

A work machine of the present invention includes a boom, an arm, a bucket, a boom cylinder, a sensing unit, and a controller. The arm is attached to a leading end of the boom. The bucket is attached to a leading end of the arm. The boom cylinder drives the boom. The sensing unit senses an acceleration of extension/retraction of the boom cylinder. The controller computes a load value within the bucket based on a load of the boom cylinder, and corrects the load value obtained by computing based on the acceleration of extension/retraction of the boom cylinder sensed by the sensing unit.

According to the work machine of the present invention, the load value within the bucket is corrected based on the acceleration of extension/retraction of the boom cylinder. Thereby, an error due to an inertia of a work implement based on an operation of the boom, the arm, the bucket, and the like can be removed from the load value. Thus, measurement accuracy when measuring the load can be improved.

In the work machine described above, in addition to correction based on the acceleration, the controller corrects the load value obtained by computing based on relational data indicative of a magnitude of an error of a load value in the bucket with respect to a load value in the bucket.

Thereby, when a model of balance of moments is different from the configuration and the state of the actual work implement, it is possible to correct an error due to the difference between the model and the actual work implement.

In the work machine described above, the relational data has a relation that the error of the load value in the bucket is decreased with an increase in the load value in the bucket.

Thereby, the relation between the load value and the error in the relational data can be adapted to the reality that, as the load value in the bucket is increased, the error of the load value with respect to the load value is relatively decreased. Thereby, the error due to the difference from a calculation model can be appropriately corrected.

In the work machine described above, in the relational data, a relation of the magnitude of the error of the load value in the bucket with respect to the load value in the bucket is expressed by a quadratic function.

Thereby, the relation between the load value and the error in the relational data can be easily adapted to the reality.

A method for controlling a work machine of the present invention is a method for controlling a work machine including a boom, an arm, a bucket, and a boom cylinder which drives the boom. In the method for controlling the work machine of the present invention, a load value within the bucket is computed based on a load of the boom cylinder. The load value obtained by computing is corrected based on an acceleration of extension/retraction of the boom cylinder.

According to the method for controlling the work machine of the present invention, the load value within the bucket is corrected based on the acceleration of extension/retraction of the boom cylinder. Thereby, an error due to an inertia of a work implement based on an operation of the boom, the arm, the bucket, and the like can be removed from the load value. Thus, measurement accuracy when measuring the load can be improved.

In the method for controlling the work machine described above, in addition to correction based on the acceleration, the load value obtained by computing is corrected based on relational data indicative of a magnitude of an error of a load value in the bucket with respect to a load value in the bucket.

Thereby, when a model of balance of moments is different from the configuration and the state of the actual work implement, it is possible to correct an error due to the difference between the model and the actual work implement.

Advantageous Effects of Invention

As described above, according to the present invention, a work machine capable of improving measurement accuracy when measuring a load, and a method for controlling the work machine can be achieved.

DESCRIPTION OF EMBODIMENTS

Hereinafter, an embodiment of the present invention will be described with reference to the drawings.

First, a configuration of a work machine in one embodiment of the present invention will be described. Hereinafter, a hydraulic excavator will be described with reference to FIG. 1 as an example of a work machine to which the idea of the present invention is applicable. It should be noted that the present invention is applicable to not only a hydraulic excavator but also a work machine having a boom, an arm, and a bucket.

In the description below, "upward", "downward", "front", "back", "left", and "right" indicate directions based on an operator seated in an operator's seat 2b within an operator's compartment 2a.

Figure 1:
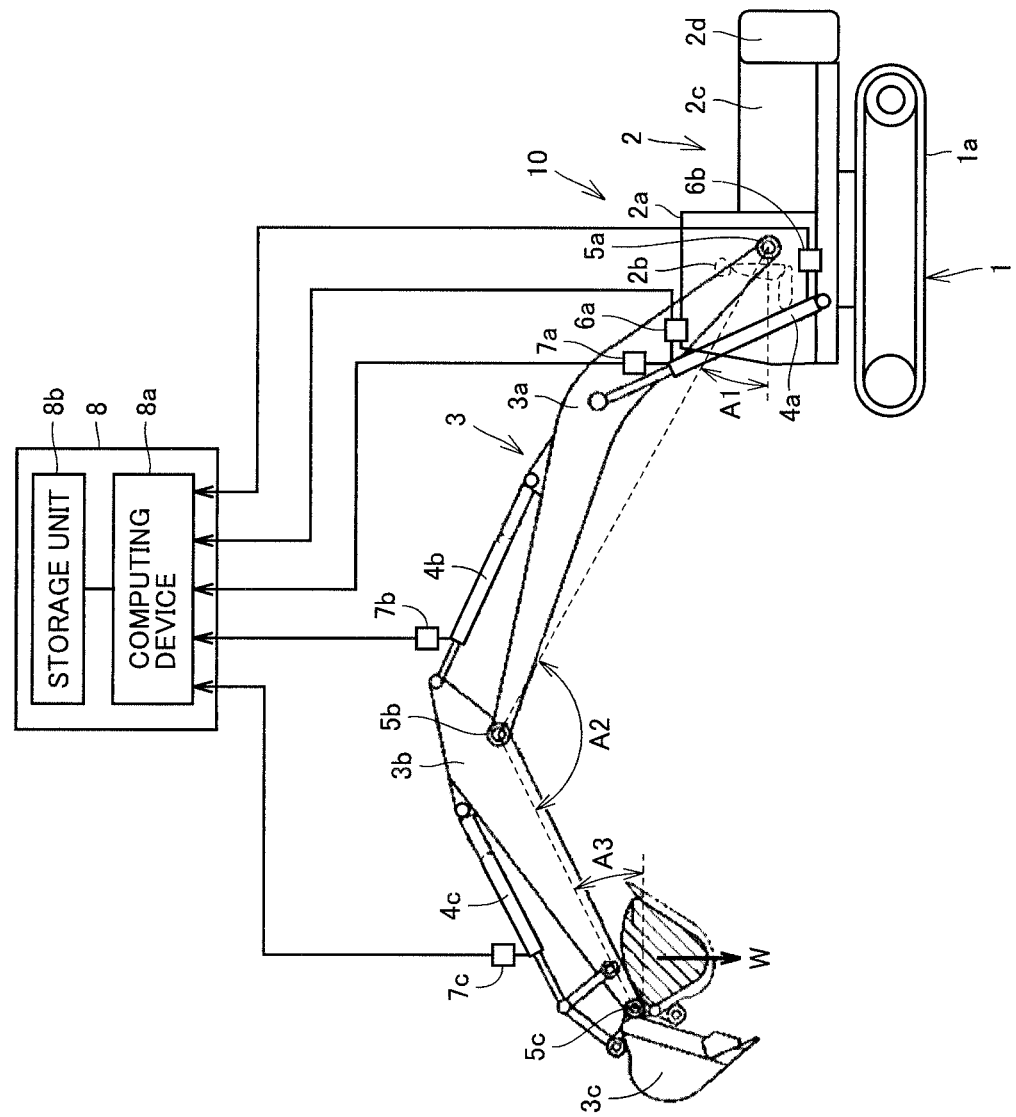
FIG. 1 is a view schematically showing a configuration of a work machine in one embodiment of the present invention.

FIG. 1 is a side view schematically showing a configuration of a hydraulic excavator as one example of the work machine in one embodiment of the present invention. As shown in FIG. 1, a hydraulic excavator 10 in the present embodiment mainly has a travel unit 1, a revolving unit 2, and a work implement 3. Travel unit 1 and revolving unit 2 constitute a main body of the work machine.

Travel unit 1 has a pair of right and left crawler belt apparatuses 1a. Each of the pair of right and left crawler belt apparatuses 1a has a crawler belt. Hydraulic excavator 10 is self-propelled as the pair of right and left crawler belts are rotationally driven.

Revolving unit 2 is mounted revolvably with respect to travel unit 1. Revolving unit 2 mainly has operator's compartment 2a, operator's seat 2b, an engine compartment 2c, and a counterweight 2d. Operator's compartment 2a is arranged, for example, on a front left side (vehicle front side) of revolving unit 2. In an internal space of operator's compartment 2a, operator's seat 2b in which the operator is to be seated is arranged.

Each of engine compartment 2c and counterweight 2d is arranged on a back side (vehicle back side) of revolving unit 2. Engine compartment 2c accommodates an engine unit (an engine, an exhaust gas treatment structure, and the like). The top of engine compartment 2c is covered with an engine hood. Counterweight 2d is arranged at the rear of engine compartment 2c.

Work implement 3 is pivotally supported on the front side of revolving unit 2 and, for example, to the right of operator's compartment 2a. Work implement 3 has, for example, a boom 3a, an arm 3b, a bucket 3c, hydraulic cylinders, 4a, 4b, and 4c, and the like. Boom 3a has a base end portion rotatably coupled to revolving unit 2 with a boom foot pin 5a. Arm 3b has a base end portion rotatably coupled to a leading end portion of boom 3a with a boom leading end pin 5b. Bucket 3c is rotatably coupled to a leading end portion of arm 3b with a pin 5c.

Boom 3a can be driven by boom cylinder 4a. By this drive, boom 3a is rotatable about boom foot pin 5a in an upward/downward direction with respect to revolving unit 2. Arm 3b can be driven by arm cylinder 4b. By this drive, arm 3b is rotatable about boom leading end pin 5b in the upward/downward direction with respect to boom 3a. Bucket 3c can be driven by bucket cylinder 4c. By this drive, bucket 3c is rotatable about pin 5c in the upward/downward direction with respect to arm 3b. Work implement 3 can be thus driven.

A pressure sensor 6a is attached to a head side of boom cylinder 4a. Pressure sensor 6a can detect a pressure of a hydraulic oil within a cylinder head-side oil chamber 40A (FIG. 2) of boom cylinder 4a (head pressure), A pressure sensor 6b is attached to a bottom side of boom cylinder 4a. Pressure sensor 6b can detect a pressure of the hydraulic oil within a cylinder bottom-side oil chamber 40B (FIG. 2) of boom cylinder 4a (bottom pressure).

Stroke sensors (sensing units) 7a, 7b, and 7c are attached to boom cylinder 4a, arm cylinder 4b, and bucket cylinder 4c, respectively.

Next, the cylinder having the stroke sensor attached thereto will be described with reference to FIGS. 2 and 3, mentioning boom cylinder 4a as an example.

Figure 2:
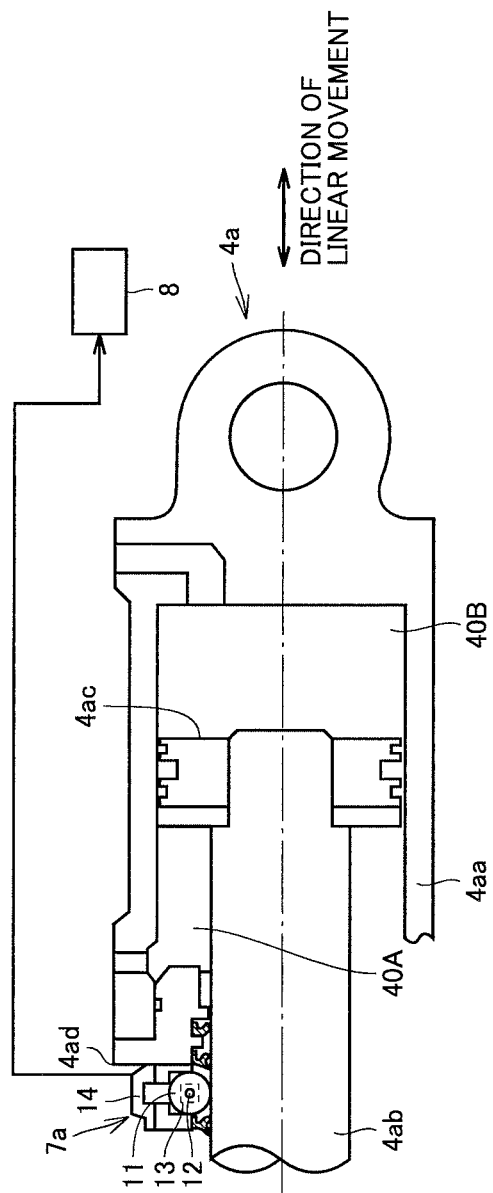
FIG. 2 is a view schematically showing a configuration of a cylinder having a stroke sensor attached thereto used for a work implement.
Figure 3:
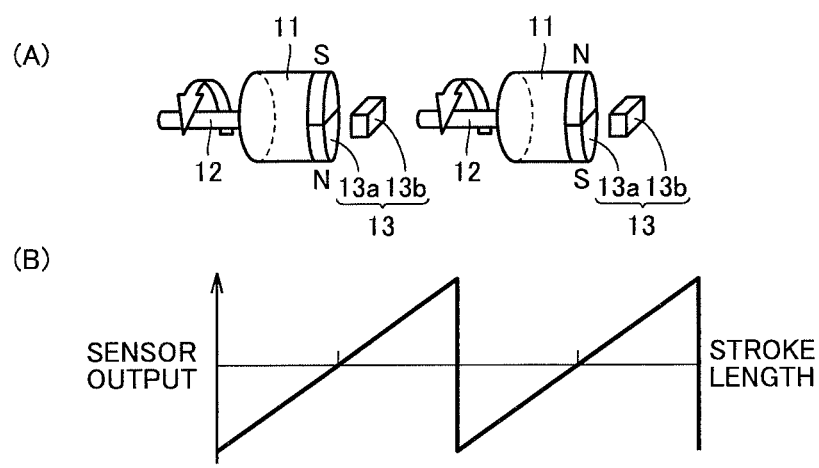
FIG. 3(A) is a view schematically showing a configuration of the stroke sensor used for the cylinder of FIG. 2.
FIG. 3(B) is a view showing how an electric signal which is a sensor output of the stroke sensor changes periodically.

FIG. 2 is a view schematically showing a configuration of the cylinder having the stroke sensor attached thereto used for the work implement. FIG. 3(A) is a view schematically showing a configuration of the stroke sensor used for the cylinder of FIG. 2. FIG. 3(B) is a view showing how an electric signal which is a sensor output of the stroke sensor changes periodically.

As shown in FIG. 2, boom cylinder 4a mainly has a cylinder tube 4aa, a cylinder rod 4ab, and a piston 4ac. Piston 4ac is attached to one end portion of cylinder rod 4ab. Piston 4ac is inserted in cylinder tube 4aa. Cylinder rod 4ab is relatively movable with respect to cylinder tube 4aa. Thereby, piston 4ac is slidable with respect to an inner wall of cylinder tube 4aa.

A chamber defined by a cylinder head 4ad, piston 4ac, and the inner wall of cylinder tube 4aa constitutes cylinder head-side oil chamber 40A. An oil chamber opposite to cylinder head-side oil chamber 40A with respect to piston 4ac constitutes cylinder bottom-side oil chamber 40B.

Cylinder rod 4ab retracts as the hydraulic oil is supplied into cylinder head-side oil chamber 40A and the hydraulic oil is discharged from cylinder bottom-side oil chamber 40B. Cylinder rod 4ab extends as the hydraulic oil is discharged from cylinder head-side oil chamber 40A and the hydraulic oil is supplied into cylinder bottom-side oil chamber 40B. Thereby, cylinder rod 4ab linearly moves in a right-left direction in the drawing.

Stroke sensor 7a is arranged, for example, at a position which is outside cylinder tube 4aa and is adjacent to cylinder head 4ad. Stroke sensor 7a is arranged inside a case 14.

Stroke sensor 7a has a rotation roller 11, a rotation central axis 12, and a rotation sensor unit 13. Rotation roller 11 is arranged such that an outer circumferential surface of rotation roller 11 contacts a surface of cylinder rod 4ab. Rotation roller 11 is rotatable about rotation central axis 12 according to linear movement of cylinder rod 4ab. Rotation sensor unit 13 is configured to be able to detect a rotation amount (rotation angle) of rotation roller 11.

As shown in FIG. 3(A), rotation sensor unit 13 has a magnet 13a and a hole IC (Integrated Circuit) 13b. Magnet 13a is attached to rotation roller 11 to rotate integrally with rotation roller 11.

Magnet 13a is configured such that an N pole and an S pole are alternately switched according to the rotation angle of rotation roller 11. Magnet 13a is configured such that a magnetic force (flux density) detected by hole IC 13b changes periodically, with one rotation of rotation roller 11 being defined as one period.

Hole IC 13b is a magnetic force sensor which detects the magnetic force (flux density) generated by magnet 13a as an electric signal. Hole IC 13b is provided at a position spaced from magnet 13a along an axial direction of rotation central axis 12.

As shown in FIG. 3(B), when rotation roller 11 rotates and thereby magnet 13a rotates, the magnetic force (flux density) passing through hole IC 13b changes periodically according to the rotation angle, and the electric signal (voltage) which is the sensor output changes periodically. The rotation angle of rotation roller 11 can be measured from the magnitude of the voltage output from hole IC 13b.

In addition, the number of rotations of rotation roller 11 can be measured by counting the number of times one period of the electric signal (voltage) output from hole IC 13b is repeated. Then, a displacement amount (stroke length) of cylinder rod 4ab in boom cylinder 4a is measured based on the rotation angle of rotation roller 11 and the number of rotations of rotation roller 11.

Each of arm cylinder 4b and bucket cylinder 4c has a configuration of a cylinder having a stroke sensor attached thereto which is the same as that of boom cylinder 4a.

As shown in FIG. 1, a boom angle A1 can be calculated from the displacement amount of cylinder rod 4ab in boom cylinder 4a. Further, an arm angle A2 can be calculated from a displacement amount of a cylinder rod in arm cylinder 4b. Further, a bucket angle A3 can be calculated from a displacement amount of a cylinder rod in bucket cylinder 4c. Furthermore, an acceleration a of extension/retraction of boom cylinder 4a can be calculated by differentiating twice the displacement amount in boom cylinder 4a with respect to time.

Each of stroke sensors 7a, 7b, 7c and pressure sensors 6a, 6b is electrically connected to a computing device 8a in a controller 8. Thereby, the head pressure and the bottom pressure of boom cylinder 4a, boom angle A1, arm angle A2, bucket angle A3, and acceleration a of extension/retraction of boom cylinder 4a described above can be transmitted to computing device 8a within controller 8.

It should be noted that boom angle A1, arm angle A2, bucket angle A3, and acceleration a of extension/retraction of boom cylinder 4a may be calculated in computing device 8a using electric signals transmitted from stroke sensors 7a, 7b, 7c to computing device 8a (electric signals detected by hole ICs 13b).

Controller 8 may have a storage unit 8b in addition to computing device 8a. In storage unit 8b, relational data (load correction table) indicative of the magnitude of an error of a load value in the bucket with respect to a true load value in the bucket described later, weights and shapes of boom 3a, arm 3b, and bucket 3c, and the like may be stored. Further, the relational data and the like may be originally stored in storage unit 8b, or may be introduced from the outside of work machine 10 into storage unit 8b through an operation by the operator.

Controller 8 (computing device 8a) has a function of computing a current load value (calculated load value) W within bucket 3c based on a load of boom cylinder 4a. Specifically, controller 8 (computing device 8a) has a function of computing current load value (calculated load value) W within bucket 3c from balance of moments of boom 3a, arm 3b, and bucket 3c. Further, controller 8 (computing device 8a) has a function of correcting the current load value obtained by computing based on the acceleration of extension/retraction of boom cylinder 4a sensed by stroke sensor 7a.

It should be noted that the load of boom cylinder 4a is a so-called axial force obtained from the head pressure and the bottom pressure of boom cylinder 4a. Further, the acceleration of extension/retraction of boom cylinder 4a used to correct the current load value is an acceleration of extension/retraction of boom cylinder 4a generated by an inertia caused by swinging of work implement 3. This swinging is not extension/retraction itself of boom cylinder 4a based on a normal operation when boom 3a is operated, but a swing of work implement 3 which occurs secondarily when work implement 3 is operated.

Further, controller 8 (computing device 8a) has a function of correcting the load value obtained by computing based on the relational data. Specifically, controller 8 (computing device 8a) has a function of correcting the load value obtained by computing based on the relational data indicative of the magnitude of the error of the load value in the bucket with respect to a true load value WR in the bucket.

Next, a method for computing current load value W within bucket 3c in the work machine in the present embodiment will be described with reference to FIG. 4.

Figure 4:
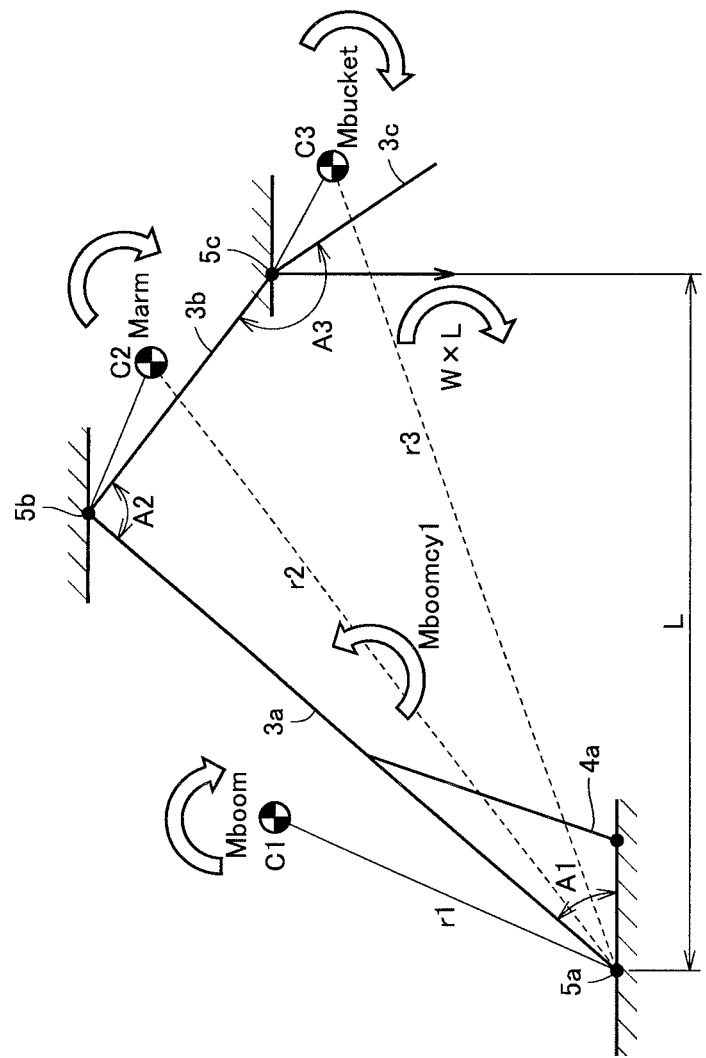
FIG. 4 is a schematic view of the work implement for illustrating balance of moments.

FIG. 4 is a schematic view of the work implement for illustrating balance of moments. As shown in FIG. 4, in the present embodiment, current load value W within bucket 3c is detected from balance of moments about boom foot pin 5a. Here, the balance of moments about boom foot pin 5a is expressed by the following equation (1).

$$Mboomcyl = Mboom + Marm + Mbucket + W \times L \qquad \text{equation (1)}.$$

In equation (1), Mboomcyl is a moment of boom cylinder 4a about boom foot pin 5a. Mboom is a moment of boom 3a about boom foot pin 5a. Marm is a moment of arm 3b about boom foot pin 5a. Mbucket is a moment of bucket 3c about boom foot pin 5a. W is the current load value within bucket 3c. L is a horizontal distance from boom foot pin 5a to pin 5c (the portion where bucket 3c is supported by arm 3b).

Mboomcyl is calculated from the load (the head pressure and the bottom pressure) of boom cylinder 4a.

Mboom is calculated by multiplying a distance r1 from a center of gravity C1 of boom 3a to boom foot pin 5a by a weight M1 of boom 3a (r1× M1). The position of center of gravity C1 of boom 3a is calculated from boom angle A1 and the like. Weight M1 of boom 3a and the like are stored in storage unit 8b.

Marm is calculated by multiplying a distance r2 from a center of gravity C2 of arm 3b to boom foot pin 5a by a weight M2 of arm 3b (r2×M2). The position of center of gravity C2 of arm 3b is calculated from arm angle A2 and the like. Weight M2 of arm 3b and the like are stored in storage unit 8b.

Mbucket is calculated by multiplying a distance r3 from a center of gravity C3 of bucket 3c to boom foot pin 5a by a weight M3 of bucket 3c (r3×M3). The position of center of gravity C3 of the bucket is calculated from bucket angle A3 and the like. Weight M3 of bucket 3c and the like are stored in storage unit 8b.

As shown in FIGS. 1 and 4, in the calculation of current load value W within bucket 3c, the displacement amounts in cylinders 4a, 4b, and 4c are detected by stroke sensors 7a, 7b, and 7c, respectively. Based on the displacement amounts in cylinders 4a, 4b, and 4c, boom angle A1, arm angle A2, and bucket angle A3 are calculated by controller 8 or the like. Based on boom angle A1, arm angle A2, and bucket angle A3, the positions of centers of gravity C1, C2, and C3 are calculated by controller 8 or the like.

Moment Mboom of boom 3a about boom foot pin 5a is calculated from the product of the position of center of gravity C1 and weight M1 of boom 3a. Further, moment Marm of arm 3b about boom foot pin 5a is calculated from the product of the position of center of gravity C2 and weight M2 of arm 3b. Further, moment Mbucket of bucket 3c about boom foot pin 5a is calculated from the product of the position of center of gravity C3 and weight M3 of bucket 3c.

On the other hand, the head pressure of boom cylinder 4a is detected by pressure sensor 6a. The bottom pressure of boom cylinder 4a is detected by pressure sensor 6b. Based on the head pressure and the bottom pressure of boom cylinder 4a, moment Mboomcyl of boom cylinder 4a about boom foot pin 5a is calculated by controller 8 or the like.

Further, based on boom angle A1 and arm angle A2 calculated above and a length of boom 3a and a length of arm 3b, horizontal distance L from boom foot pin 5a to pin 5c is calculated by controller 8 or the like.

By substituting moments Mboomcyl, Mboom, Marm, and Mbucket and distance L calculated above into the above equation (1), current load value W within bucket 3c is calculated by controller 8 or the like.

As described above, load value W is calculated using the displacement amounts in cylinders 4a, 4b, and 4c, the head pressure, the bottom pressure, and the like. Accordingly, when work implement 3 is operated, an error occurs in a measured value of load value W due to an inertia force of work implement 3. Specifically, load value W measured above includes not only true load value WR but also an error E1 due to the inertia of work implement 3.

As a result of earnest studies by the present inventor in view of the above, the present inventor has found that error E1 due to the inertia of work implement 3 can be detected by a change in acceleration a of extension/retraction of boom cylinder 4a. Accordingly, the finding that error E1 due to the inertia of work implement 3 can be detected by a change in acceleration a of extension/retraction of boom cylinder 4a will now be described with reference to FIGS. 5(A) to 5(C).

The present inventor determined the load value (calculated load value) within bucket 3c when the boom was operated, from the balance of the moments described above. FIG. 5(A) shows a result thereof, and shows a temporal change in the load value within bucket 3c. The present inventor also investigated the acceleration of extension/retraction of the boom cylinder when the boom was operated. FIG. 5(B) shows a result thereof, and shows a temporal change in the acceleration. In addition, FIG. 5(C) shows a temporal change in a PPC (Pressure Proportional Control) pressure of the boom cylinder when the boom was operated.

As shown in FIG. 5(C), when an operation of boom cylinder 4a is started, the PPC pressure of the boom cylinder rises. When the operation of boom cylinder 4a is started, an amplitude is generated in a calculated load as shown in FIG. 5(A). This amplitude attenuates with time while the PPC pressure of boom cylinder 4a is maintained.

Thereafter, as shown in FIG. 5(C), when the operation of boom cylinder 4a is stopped, the PPC pressure of the boom cylinder falls. Also when the operation of boom cylinder 4a is stopped, an amplitude is generated in a curve of the calculated load value as shown in FIG. 5(A). This amplitude attenuates with time while the PPC pressure of boom cylinder 4a is maintained constant.

True load value WR within bucket 3c does not change with time. Accordingly, a change indicated by the amplitude which appears in the curve of the load value in FIG. 5(A) is an error. This amplitude, which is an error, is generated when an operation of boom 3a is started and stopped. Accordingly, the error (amplitude) generated in the calculated load value is considered to be an error due to the inertia caused when work implement 3 such as boom 3a is operated.

Figure 5:
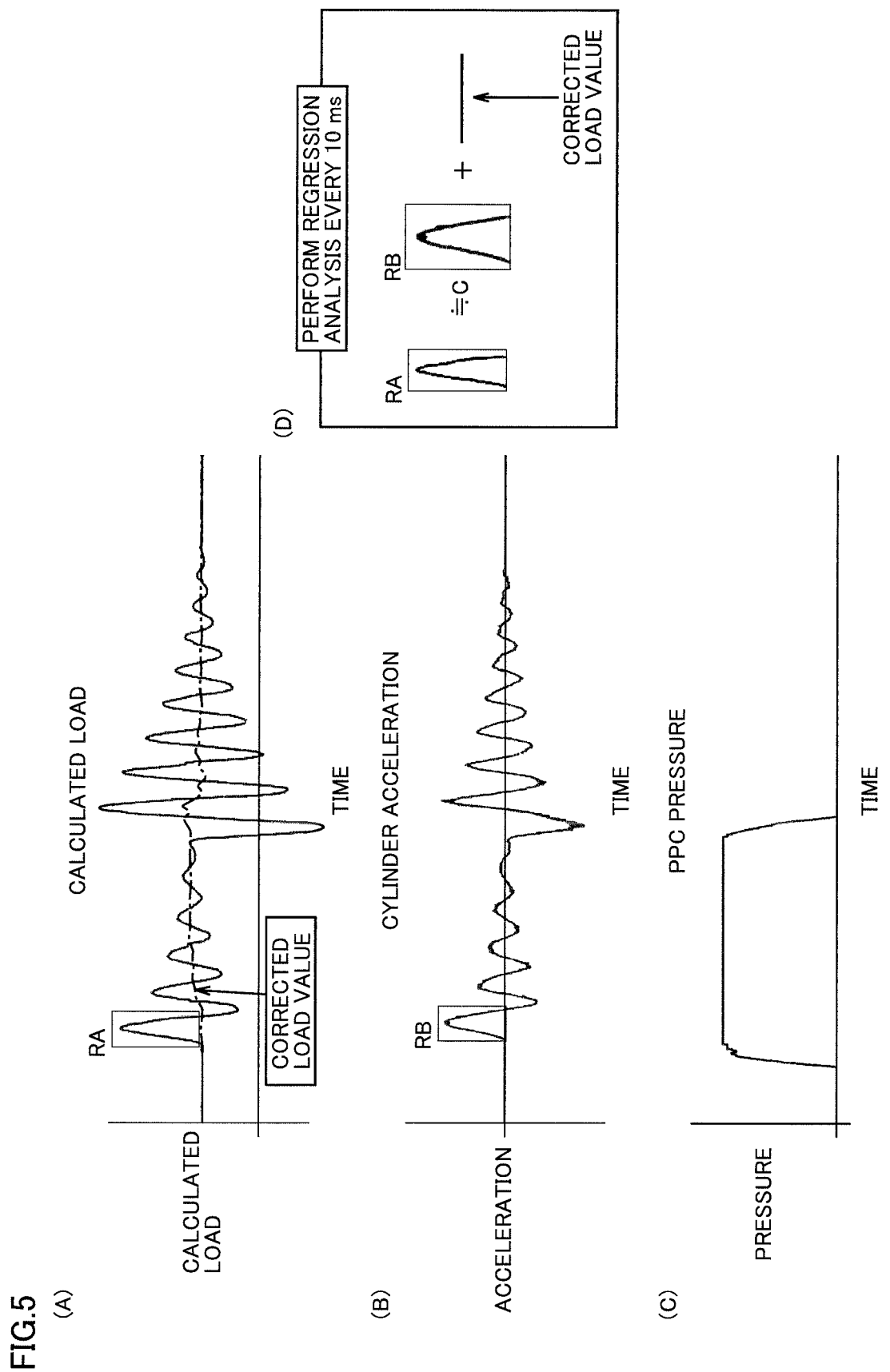
FIG. 5(A) is a view showing a temporal change in a calculated load value W.
FIG. 5(B) is a view showing a temporal change in an acceleration of extension/retraction of a boom cylinder.
FIG. 5(C) is a view showing a temporal change in a PPC pressure in the boom cylinder.
FIG. 5(D) is a view conceptually showing an equation for calculating a corrected load value from the amplitude of the calculated load and the amplitude of the acceleration.

On the other hand, as shown in FIG. 5 (B), an amplitude is also generated in the acceleration of extension/retraction of boom cylinder 4a, at the same timing as that in the calculated load value shown in FIG. 5(A). From this result, the present inventor has found that the error due to the inertia of work implement 3 can be detected by detecting the amplitude generated in a curve of the acceleration of extension/retraction of boom cylinder 4a.

Next, a method for removing the error due to the inertia of work implement 3 from the calculated load value by correcting the calculated load value based on the amplitude generated in the curve of the acceleration of extension/retraction of boom cylinder 4a will be described with reference to FIG. 5(D) and FIGS. 6(A) and 6(B).

FIG. 5(D) is a view conceptually showing an equation for calculating a corrected load value from the amplitude of the calculated load and the amplitude of the acceleration. FIG. 6(A) is a view showing a temporal change in the calculated load value within the bucket. FIG. 6(B) is a view showing a temporal change in the acceleration of extension/retraction of the boom cylinder.

In order to remove the error due to the inertia of work implement 3 from the calculated load value, a regression analysis (least square method) is used. In the regression analysis, first, a regression equation is formulated. The regression equation is, for example, the equation shown in FIG. 5(D).

As shown in FIG. 5(D), the regression equation is formulated such that the calculated load (for example, a portion RA of the amplitude in FIG. 5(A)) becomes substantially equal to a value obtained by adding the corrected load value to the product of the amplitude of the acceleration (for example, a portion RB of the amplitude in FIG. 5(B)) and a coefficient c. Specifically, the amplitude of the acceleration of extension/retraction of boom cylinder 4a is approximated to the amplitude of the calculated load, by being multiplied with predetermined coefficient c. By subtracting the amplitude of the acceleration approximated to the amplitude of the calculated load from the calculated load, the corrected load value with the error due to the inertia of work implement 3 having been canceled is calculated.

Coefficient c in the regression equation is determined based on a measured value of the calculated load and a measured value of the acceleration of extension/retraction of the boom cylinder.

Figure 6:
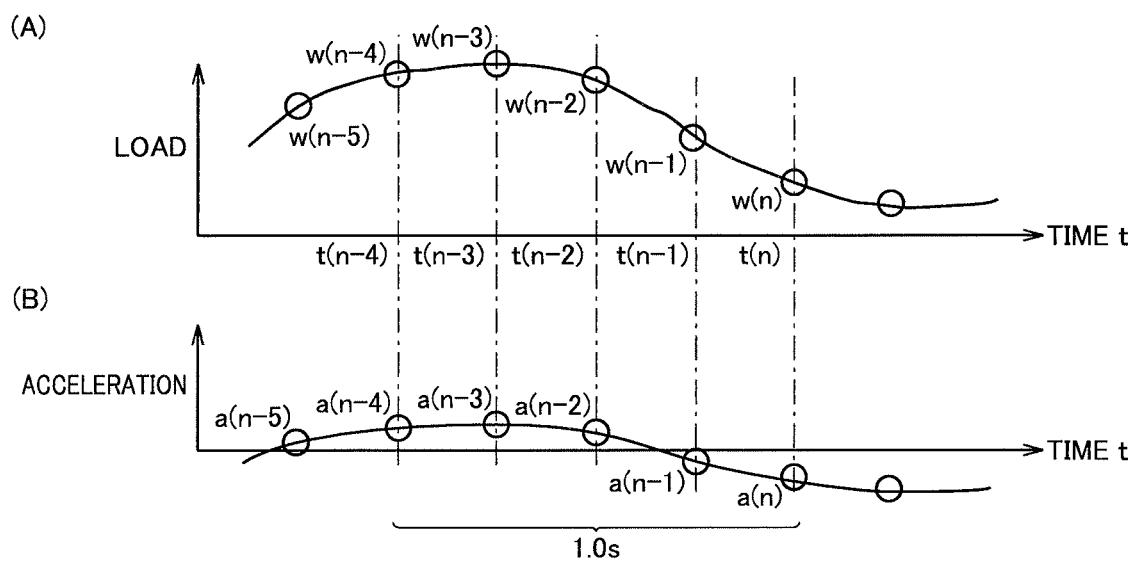
FIG. 6(A) is a view showing a temporal change in the calculated load value within a bucket.
FIG. 6(B) is a view showing a temporal change in the acceleration of extension/retraction of the boom cylinder.

Specifically, as shown in FIGS. 6(A) and 6(B), a waveform of the acceleration is obtained from accelerations (for example, a(n−4), a(n−3), a(n−2), a(n−1), a(n)) at five points measured for 1.0 second immediately before a time t(n).

Further, a waveform of the load is obtained from loads (w(n−4), w(n−3), w(n−2), w(n−1), w(n)) at five points measured for 1.0 second immediately before time t(n).

Coefficient c is determined by mutually comparing the waveform of the acceleration and the waveform of the load obtained as described above. On this occasion, with what coefficient c the waveform of the acceleration can be most approximated to the waveform of the load is computed, and coefficient c is thus obtained from a result of the computing.

After coefficient c is obtained, coefficient c and the acceleration of extension/retraction of the boom cylinder and the calculated load at time t(n) are substituted into the equation shown in FIG. 5(D). Thereby, the corrected load value at time t(n) is determined.

The above regression analysis is performed every 10 milliseconds, for example. Thereby, the corrected load value is obtained every 10 milliseconds. The corrected load value obtained as described above is plotted at the same time interval. Thereby, a curve of the corrected load value as indicated by an alternate long and short dash line, for example, in FIG. 5(A) is obtained. In the corrected load value, the error (amplitude) due to the inertia of work implement 3 has been canceled.

Thus, the corrected load value with the error due to the inertia of work implement 3 being removed from the calculated load value is obtained by correcting the calculated load value based on the amplitude generated in the curve of the acceleration of extension/retraction of boom cylinder 4a.

In the curve of the corrected load value as indicated by the alternate long and short dash line in FIG. 5(A), the load value still does not have a constant value (straight line), and changes with time. This is considered to be because a calculation model shown in FIG. 4 for calculating calculated load W has an assumption different from actual work implement 3 shown in FIG. 1.

Specifically, the calculation model shown in FIG. 4 assumes that load W is located at a leading end of arm 3b (that is, at pin 5c). On the other hand, in actual work machine 10 shown in FIG. 1, load W is located within bucket 3c. Accordingly, the assumption of the calculation model in FIG. 4 and actual work implement 3 in FIG. 1 are different from each other in the position of load W.

Further, the calculation model shown in FIG. 4 assumes that bucket 3c is rotated to be closest to arm 3b and fixed at that position. On the other hand, in actual work machine 10 shown in FIG. 1, bucket 3c is also rotated with respect to arm 3b as boom 3a and arm 3b are operated. Accordingly, the assumption of the calculation model in FIG. 4 and actual work implement 3 in FIG. 1 are also different from each other in the rotating position of bucket 3c with respect to arm 3b.

Further, the calculation model shown in FIG. 4 does not assume a sliding resistance of boom cylinder 4a (friction caused when the cylinder is operated). On the other hand, in actual work machine 10 shown in FIG. 1, the sliding resistance of boom cylinder 4a is generated. Accordingly, the assumption of the calculation model in FIG. 4 and actual work implement 3 in FIG. 1 are also different from each other in the presence or absence of the sliding resistance of boom cylinder 4a.

The corrected load value is considered to include an error E2 caused because the calculation model in FIG. 4 has an assumption different from actual work implement 3 shown in FIG. 1 as described above. Accordingly, correction for removing error E2 due to the difference from the calculation model from the corrected load value will now be described with reference to FIG. 7.

Figure 7:
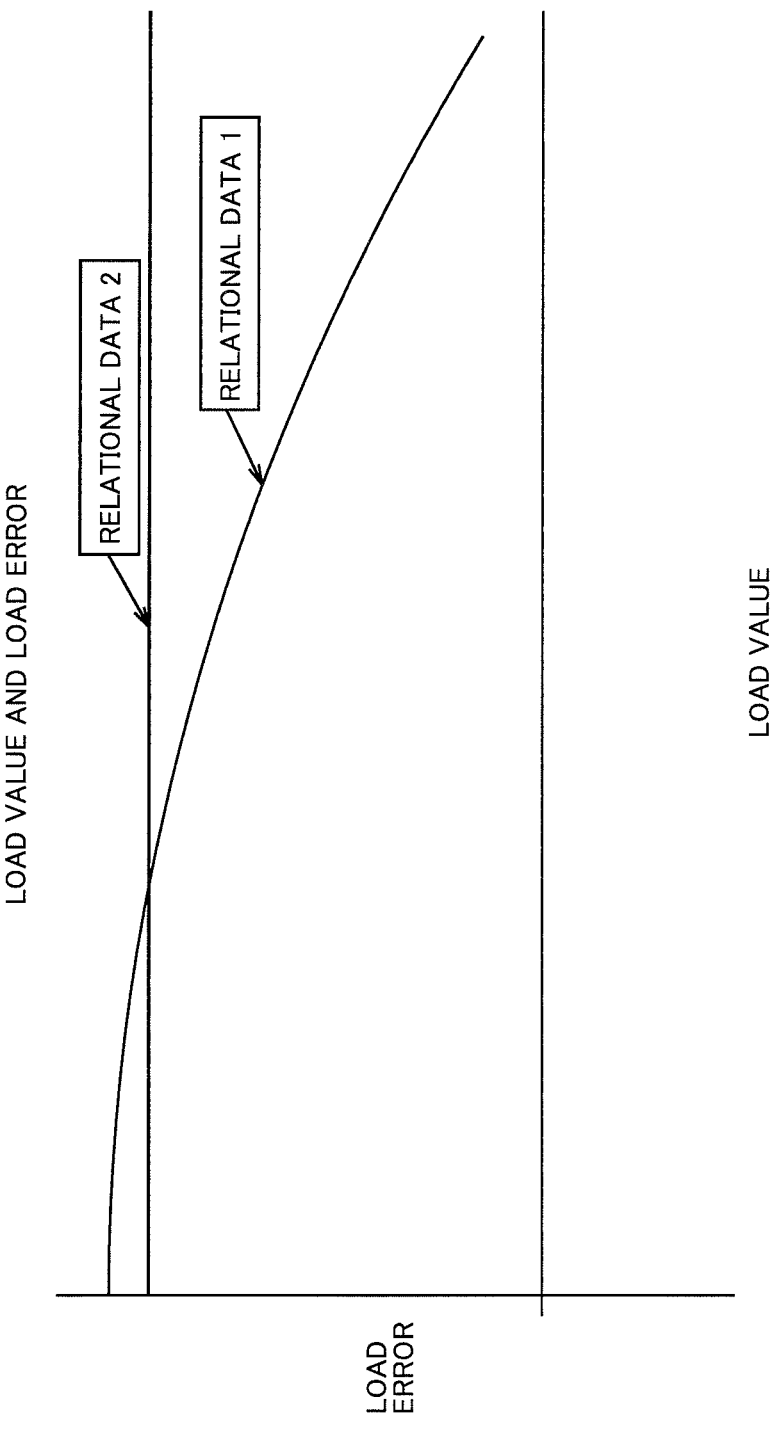
FIG. 7 is a view showing the relation between a load value within the bucket and an error of the load value within the bucket.

FIG. 7 is a view showing the relation between a load value within bucket 3c and an error of the load value within bucket 3c. Relational data 1 (load correction table) indicative of the relation between the load value and the error of the load value within bucket 3c as shown in FIG. 7 is used, for example, for the correction for removing error E2 from the corrected load value described above.

Relational data 1 has a relation that the error of the load value is decreased with an increase in the load value. In relational data 1, the greater the load value is, the greater the amount of correction (absolute value) to the calculated load value (for example, the corrected load value) is. Here, after the error due to the inertia of work implement 3 described above is corrected, the load value in the relational data refers to the corrected load value.

In addition, in relational data 1, the relation of the magnitude of the error of the load value within bucket 3c with respect to the load value within bucket 3c is expressed by a quadratic function, for example. In this case, the magnitude of the error of the load value is decreased quadratically with an increase in the load value within bucket 3c.

In the correction using relational data 1, a true load value is calculated by removing a load error from the corrected load value on which the correction of error E1 due to the inertia of work implement 3 has been performed above, based on the relation indicated in relational data 1.

As a result of earnest studies for removing error E2 due to the difference from the calculation model from the calculated load value (for example, the corrected load value), the present inventor has found that error E2 can be appropriately removed when correction is performed using relational data 1.

When correction was performed using relational data which had a constant load error irrespective of the value of the true load value, for example such as relational data 2 shown in FIG. 7, it was not possible to perform correction accurately. In contrast, when relational data 1 was used, it was possible to obtain a curve of the corrected load value as indicated by an alternate long and two short dashes line in FIG. 8(B).

Figure 8:
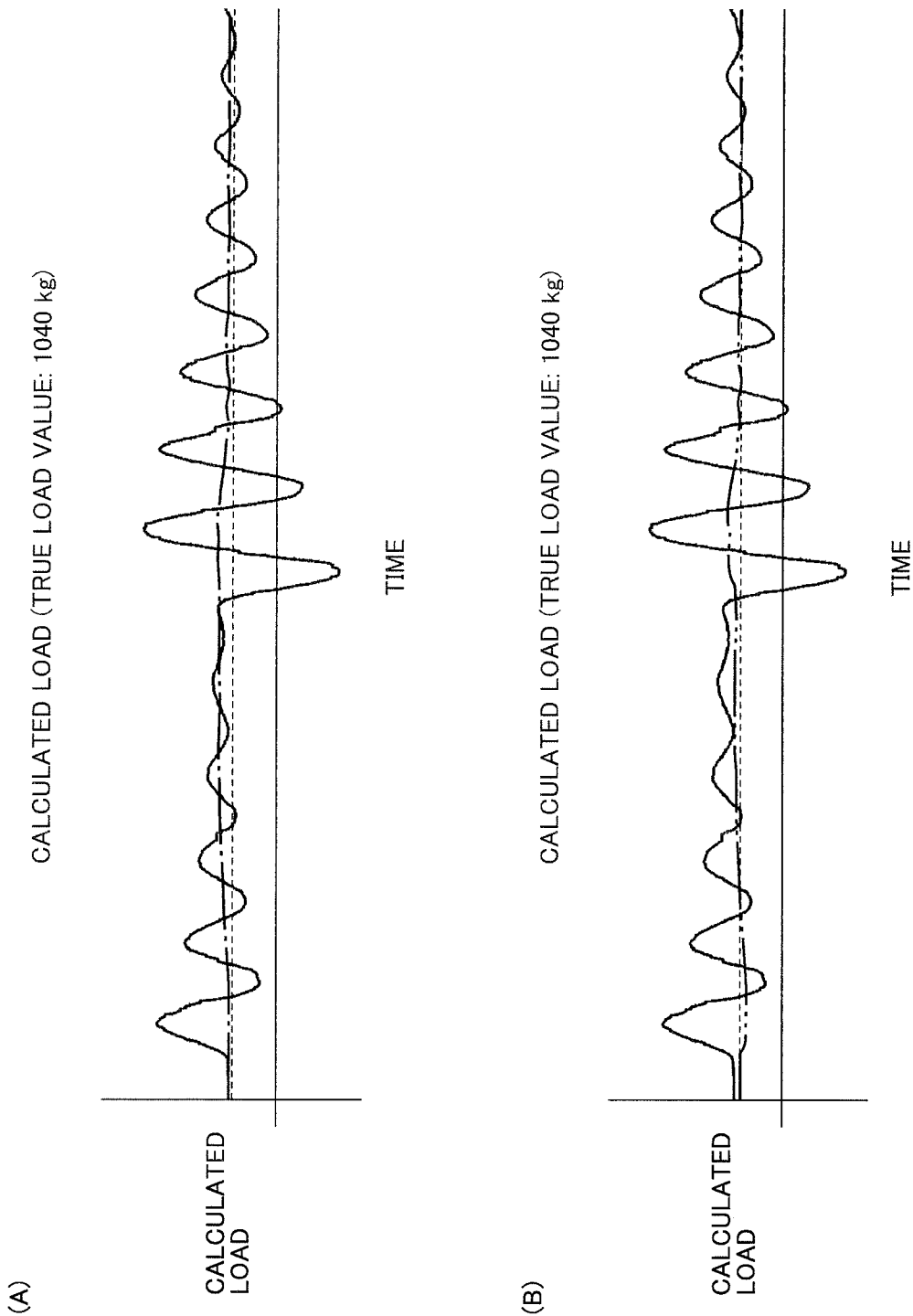
FIG. 8(A) is a view showing a result of a calculated load when only correction based on the acceleration of extension/retraction of the boom cylinder is performed.
FIG. 8(B) is a view showing a result of a calculated load when correction based on the acceleration of extension/retraction of the boom cylinder and correction based on relational data (table correction) are performed.

The curve of the corrected load value shown in FIG. 8(B) is closer to a constant value than a curve of the corrected load value shown in FIG. 8(A) (a curve indicated by an alternate long and short dash line) on which only the correction of error E1 due to the inertia of work implement 3 has been performed. It has been found from this result that error E2 can be appropriately removed by performing correction using relational data 1 shown in FIG. 7.

It should be noted that the present embodiment has described a case where the correction of error E2 due to the difference from the calculation model described above is performed on the load value which has been subjected to the correction of error E1 due to the inertia of work implement 3. However, the correction of error E2 due to the difference from the calculation model described above may be performed before the correction of error E1 due to the inertia of work implement 3. Further, the correction of error E2 due to the difference from the calculation model described above may be performed simultaneously with the correction of error E1 due to the inertia of work implement 3.

Further, only the correction of error E1 due to the inertia of work implement 3 may be performed without performing the correction of error E2 due to the difference from the calculation model described above. Further, only the correction of error E2 due to the difference from the calculation model may be performed without performing the correction of error E1 due to the inertia of work implement 3. In particular when boom cylinder 4*a* is not operated and is at rest, only the correction of error E2 due to the difference from the calculation model is performed.

It should be noted that, when error E2 due to the difference from the calculation model is corrected before error E1 due to the inertia of work implement 3 is corrected, or when only the correction of error E2 due to the difference from the calculation model is performed, the load value in relational data 1 in FIG. 7 refers to the calculated load value obtained from the balance of moments.

Next, the function and effect of the present embodiment will be described.

In the present embodiment, load value W within bucket 3*c* is corrected based on the acceleration of extension/retraction of boom cylinder 4*a*. Thereby, error E1 due to the inertia of work implement 3 based on the operation of boom 3*a*, arm 3*b*, bucket 3*c*, and the like can be removed from load value W. Thus, measurement accuracy when measuring the load can be improved.

Further, in addition to the correction based on the acceleration, controller 8 corrects the load value obtained by computing based on the relational data indicative of the magnitude of an error of a load value in the bucket with respect to the load value in bucket 3*c*. Thereby, even when the model of the balance of moments shown in FIG. 4 has an assumption different from the configuration and the state of actual work implement 3 shown in FIG. 1, it is possible to correct error E2 due to the difference between the model and the actual work implement.

Further, as shown in FIG. 7, relational data 1 has a relation that the error of load value W in bucket 3*c* is decreased with an increase in the load value in bucket 3*c*. Thereby, the relation between the load value and the error in relational data 1 can be adapted to the reality that, as the load value in bucket 3*c* is increased, the error of the load value with respect to the load value is relatively decreased. Thereby, the error due to the difference from the calculation model can be appropriately corrected.

Further, in relational data 1 in FIG. 7, the relation of the magnitude of the error of the load value in bucket 3*c* with respect to the load value in bucket 3*c* is expressed by a quadratic function. Thereby, the relation between the load value and the error in relational data 1 can be easily adapted to the reality.

It should be noted that controller 8 only has to have the function of computing current load value (calculated load value) W within bucket 3*c* based on the load of boom cylinder 4*a*. One example of this function is a function of computing current load value (calculated load value) W within bucket 3*c* from balance of static moments of boom 3*a*, arm 3*b*, and bucket 3*c*, as shown in FIG. 4.

As another example of this function, a function of computing current load value (calculated load value) W within bucket 3*c* from balance of dynamic moments of boom 3*a*, arm 3*b*, and bucket 3*c* may be used. As still another example thereof, a function of computing current load value (calculated load value) W within bucket 3*c* from balance of static or dynamic moments of boom 3*a*, arm 3*b*, bucket 3*c*, cylinders 4*a*, 4*b*, and 4*c*, and the like may be used. As still another example thereof, a function of computing current load value (calculated load value) W within bucket 3*c* from balance of forces of constituting members of work implement 3 may be used.

It should be understood that the embodiment disclosed herein is illustrative and non-restrictive in every respect. The scope of the present invention is defined by the scope of the claims, rather than the description above, and is intended to include any modifications within the scope and meaning equivalent to the scope of the claims.

REFERENCE SIGNS LIST

1: travel unit; 1*a*: crawler belt apparatus; 2: revolving unit; 2*a*: operator's compartment; 2*b*: operator's seat; 2*c*: engine compartment; 2*d*: counterweight; 3: work implement; 3*a*: boom; 3*b*: arm; 3*c*: bucket; 4*a*: boom cylinder; 4*aa*: cylinder tube; 4*ab*: cylinder rod; 4*ac*: piston; 4*ad*: cylinder head; 4*b*: arm cylinder; 4*c*: bucket cylinder; 5*a*: boom foot pin; 5*b*: boom leading end pin; 5*c*: pin; 6*a*, 6*b*: pressure sensor; 7*a*, 7*b*, 7*c*: stroke sensor; 8: controller; 8*a*: computing device; 8*b*: storage unit; 10: work machine; 11: rotation roller; 12: rotation central axis; 13: rotation sensor unit; 13*a*: magnet; 13*b*: hole IC; 14: case; 40A: cylinder head-side oil chamber; 40B: cylinder bottom-side oil chamber.

The invention claimed is:

1. A work machine, comprising:
a boom;
an arm attached to a leading end of the boom;
a bucket attached to a leading end of the arm;
a boom cylinder which drives the boom and has a cylinder rod;
a stroke sensor which detects a displacement amount of the cylinder rod in the boom cylinder;
a pressure sensor which senses at least one pressure, the at least one pressure being at least one of a head pressure of the boom cylinder and a bottom pressure of the boom cylinder; and
a controller configured to:
calculate an acceleration of extension/retraction of the boom cylinder based on the detected displacement amount of the cylinder rod in the boom cylinder,
compute a load value within the bucket based on a load of the boom cylinder as determined by the at least one pressure, and
correct the computed load value based on the calculated acceleration of extension/retraction of the boom cylinder.

2. The work machine according to claim 1, wherein, in addition to correcting the computed load value based on the calculated acceleration of extension/retraction of the boom cylinder, the controller corrects the computed load value based on relational data indicative of a magnitude of an error of a load value in the bucket with respect to a load value in the bucket.

3. The work machine according to claim 2, wherein the relational data has a relation that the error of the load value in the bucket is decreased with an increase in the load value in the bucket.

4. The work machine according to claim 3, wherein the error of the load value in the bucket is decreased quadratically.

5. A method for controlling a work machine including a boom, an arm, a bucket, and a boom cylinder which has a cylinder rod and drives the boom, comprising:
detecting a displacement amount of the cylinder rod in the boom cylinder with a stroke sensor;
sensing at least one pressure with a pressure sensor, the at least one pressure being at least one of a head pressure of the boom cylinder and a bottom pressure of the boom cylinder;

calculating an acceleration of extension/retraction of the boom cylinder based on the detected displacement amount of the cylinder rod in the boom cylinder;

computing a load value within the bucket based on a load of the boom cylinder as determined by the at least one pressure; and correcting the computed load value based on the calculated acceleration of extension/retraction of the boom cylinder.

6. The method for controlling the work machine according to claim 5, further comprising, in addition to correcting the computed load value based on the calculated acceleration of extension/retraction of the boom cylinder, correcting the computed load value based on relational data indicative of a magnitude of an error of a load value in the bucket with respect to a load value in the bucket.

* * * * *